United States Patent [19]
Johnson

[11] 4,002,441
[45] Jan. 11, 1977

[54] WASH SECTION FOR AIR-CLEANING DEVICE

[76] Inventor: Willard Lewis Johnson, 12923 Lincoln Ave., Huntington Woods, Mich. 48070

[22] Filed: Mar. 21, 1975

[21] Appl. No.: 560,614

[52] U.S. Cl. .................................. 55/226; 55/241; 55/436; 261/62; 261/109; 261/112; 261/DIG. 54

[51] Int. Cl.² ........................................ B01D 47/10

[58] Field of Search ................. 55/226, 241, 436; 261/DIG. 54, DIG. 56, 62, 109, 112

[56] References Cited

UNITED STATES PATENTS

| | | | |
|---|---|---|---|
| 1,073,621 | 9/1913 | Murray | 55/241 X |
| 1,101,736 | 6/1914 | Gillett | 261/62 |
| 1,360,445 | 11/1920 | Rollins | 261/62 X |
| 1,417,501 | 5/1922 | Collier | 261/62 X |
| 1,927,091 | 9/1933 | Hess | 261/62 X |
| 2,084,489 | 6/1937 | Hess | 261/DIG. 56 X |
| 2,234,735 | 3/1941 | Lambert et al. | 261/DIG. 54 X |
| 3,182,977 | 5/1965 | Erni | 55/241 X |
| 3,393,901 | 7/1968 | Krause | 261/62 |
| 3,556,489 | 1/1971 | Ueda | 261/62 |
| 3,638,924 | 2/1972 | Calaceto et al. | 261/62 |
| 3,811,252 | 5/1974 | Evans et al. | 55/241 X |
| 3,856,487 | 12/1974 | Perez | 55/226 X |
| 3,880,962 | 4/1975 | Rhodes et al. | 261/DIG. 56 X |

FOREIGN PATENTS OR APPLICATIONS

| | | | |
|---|---|---|---|
| 17,344 | 7/1914 | United Kingdom | 55/241 |

Primary Examiner—Frank W. Lutter
Assistant Examiner—Kathleen J. Prunner

[57] ABSTRACT

In an air cleaning device including a wash section wherein the wash section comprises a housing having front, rear and lateral side walls to define a passageway. Within the passageway and secured to opposite facing walls thereof is a pair of removably, adjustably arranged baffle members arranged in spaced apart relationship to form a venturi passage therebetween. Above the pair of baffle members but within the passageway and secured to a wall thereof is located a wash liquid discharge chamber arranged to discharge wash liquid downwardly onto a baffle plate member whereby the wash liquid issues across the entire width of the wash section in substantially a planar sheet of liquid to meet the contaminated air stream.

18 Claims, 10 Drawing Figures

WASH SECTION FOR AIR-CLEANING DEVICE

BACKGROUND OF THE INVENTION

The wash section of this invention is embodied in an air cleaning device including additionally a settling tank section, a moisture eliminator section and an air suction fan section arranged substantially contiguous to each other (although the wash section and the suction fan section can each be arranged in spaced apart relationship from the other two sections of the device). An input contaminated air stream is drawn through the wash section and the settling tank and moisture eliminator sections, and from the latter into the air suction fan section from which clean air is discharged. The wash section may be conjunctively arranged with the moisture eliminator section and the settling tank section or it may be somewhat removed therefrom, so long as a conduit or passageway is provided for the wash liquid-charged air stream between the wash section and the settling tank and moisture eliminator sections of the device.

Reference is made to Evans et al U.S. Pat. No. 3,811,252, issued May 21, 1974 for "Air Cleaning Device" for a full description of the apparatus in which the wash section of the instant disclosure is embodied. The improvement disclosed and claimed herein relates solely to the wash section of the device.

It has been found that the merit of the air cleaning device disclosed in the aforementioned patent resided in part in generating substantial turbulence of wash liquid and input air stream in the wash section. Such turbulence was created by arranging a plurality of removable adjustable baffle members in vertically staggered relationship on opposite facing walls of the wash section, forming a tortuous path therethrough. To improve such turbulence and increase the number of moisture droplets for entrapment of solid particles in the air stream, the instant invention employs only a pair of baffle members arranged in spaced apart relationship on opposite facing walls of the wash section to form a venturi passage therebetween. The baffle members extend from one lateral side wall to the other side wall of the chamber. A further improvement in the wash section over that previously disclosed involves discharging wash liquid under pressure from a chamber extending the width of the wash section onto a deflecting baffle plate, whereby the wash liquid issues across the entire width of the wash section from one side edge to the other in substantially a planar sheet of liquid to meet the contaminated input air stream.

Each of the two venturi-forming baffle members are supported upon brackets secured to the walls of the wash section and can be adjustably and removably positioned to increase or decrease the venturi opening therebetween. Thus, the turbulence earlier found to be so meritorious in removing particulate matter from the input air stream is now further increased by the venturi of this invention.

The structural and functional features and relationships of the remaining sections associated with and connected to the wash section remain substantially the same as those disclosed in the aforesaid Letters Patent, and a detailed description of those sections will be found therein. A general description of these sections is found hereinbelow.

SUMMARY OF THE INVENTION

The invention relates primarily to the utilization of a pair of baffle members arranged to form a venturi opening therebetween in the wash section of the air cleaning device. The baffle members are removably and adjustably secured in position in the wash section so as to provide a venturi opening of optimum effect therebetween whereby increased turbulence is generated in the wash liquid laden input air stream as it passes through the wash section. Means for adjustably positioning and supporting the venturi-forming baffle members are provided on opposite facing walls of the wash section.

It is a principal object of the invention to provide a wash section in an air cleaning device having a pair of adjustably removable baffle members having a transverse configuration such that a venturi passage is formed therebetween. Another object is to provide a pair of baffle members in a venturi-forming orientation whereby a wash liquid laden input air stream achieves increased turbulence in the wash section so that more of the distinct discrete contaminant particles are trapped by the wash liquid droplets formed in and by the turbulence to clad the particles with liquid so that they either fall into the settling tank liquid or impinge upon the moisture eliminator vanes in the moisture eliminator section. Still another object is to provide a pair of baffle members forming a venturi opening in the wash section so that the increased turbulence generated thereby increases the mass and weight of the particles by the amount of wash liquid covering them so that they can be more easily removed by gravity from the input air stream in the settling tank or moisture eliminator sections of the air cleaning device.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which.

DESCRIPTION OF THE PREFERRED EMBODIMENT

As illustrated in the several views of the drawings, showing a preferred embodiment of the invention disclosed herein, the unitary air cleaning device or apparatus 10 comprises a wash section 12 to receive an input contaminated air stream to the machine, a settling tank section 14 in which a sludge conveyor section 16 is provided for removing contaminants deposited into the liquid of the settling tank, a moisture eliminator section 18 adjacent and communicating with the settling tank and wash sections, and an air suction fan section 20 communicating with, receiving and discharging clean air drawn from the moisture eliminator section therebelow.

The wash section 12 comprises a sheet metal housing 22 having a front wall 24, lateral side walls 26 and 28, one or both of which can be provided with a window therein for visual inspection of the washing function, and a rear or interior wall 30, which may be common with the wall of the housing defining the moisture eliminator section and settling tank or may be independent thereof.

Adjacent the wash section, communicating therewith and with the settling tank section 14 is a pump section 32 comprising a housing 34 having a top plate 36, a front wall 38, lateral side walls 40 and 42, and a bottom wall portion 44 integral with bottom wall portions of the wash section 12 and the settling tank section 14.

The wash section 12 is served by the pump section 32 with wash liquid from within the housing containing one or more chemicals or additives particularly adapted to wet, encase, entrap or entrain the particulate matter carried by the input air stream. The wash liquid is injected forcibly and forcefully at relatively low velocity, by comparison to the velocity of the input air stream, into the wash section in a direction substantially transversely to the flow of the air stream, generating considerable turbulence therewith. A first baffle plate 48, to deflect the wash liquid into the air stream, is secured to the inner wall 30, projecting therefrom across the entire width of the wash section from one lateral side wall 26 to the other 28. An extension plate member 50 is adjustably secured thereto by suitable fastening members 52 so as to increase or decrease the effective area of the baffle plate.

Figure 1:
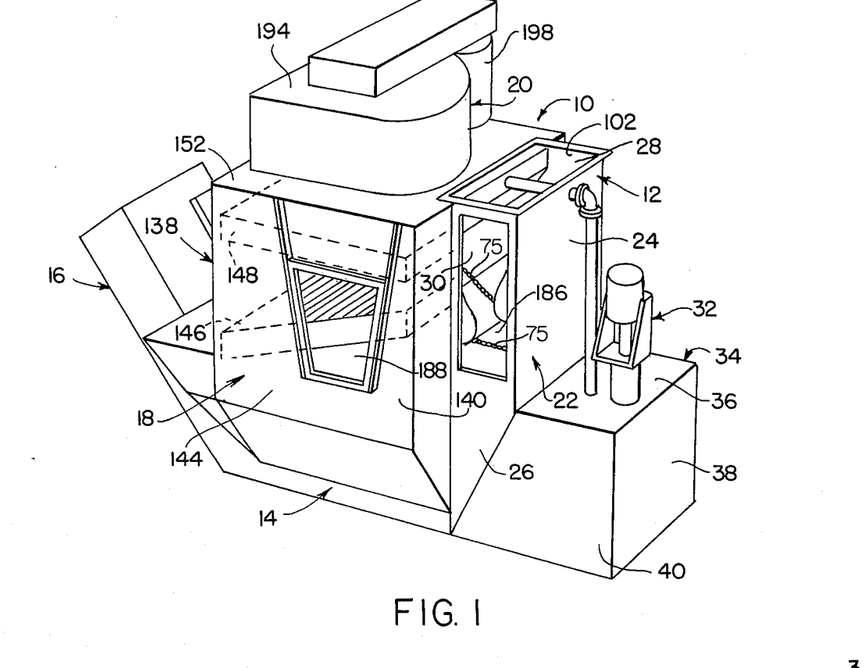
FIGS. 1 and 2 are perspective views of an air cleaning device embodying the invention hereindisclosed, taken from right and left perspective points of reference.
Figure 2:
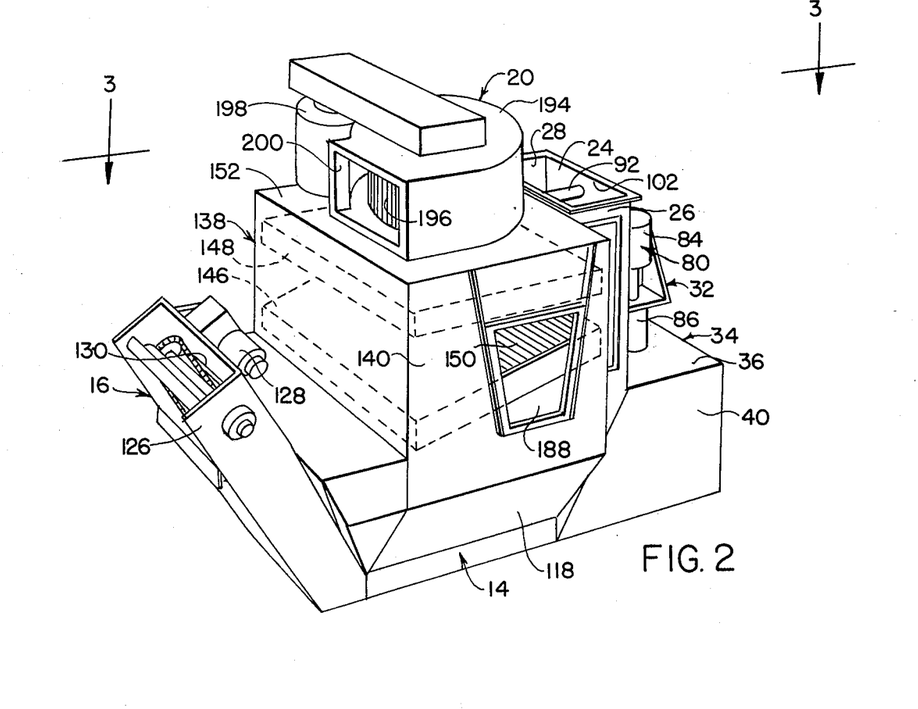
Figure 3:
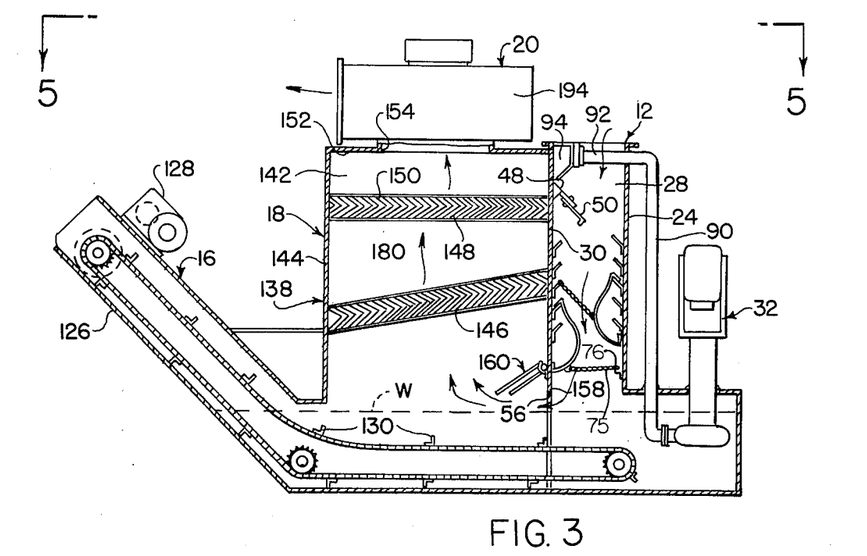
FIG. 3 is a vertical longitudinally extending sectional view taken substantially on the line 3—3 of FIG. 2.
Figure 4:
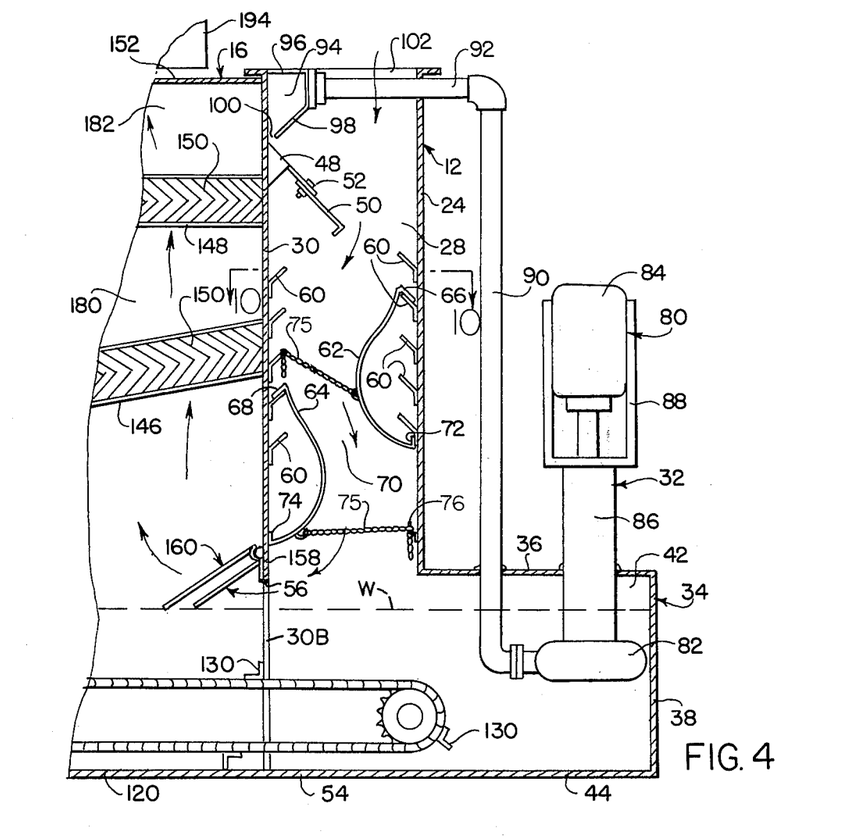
FIG. 4 is an enlarged vertical longitudinally extending sectional view primarily of the wash section of the air cleaning device illustrated in FIGS. 1 and 2.
Figure 5:
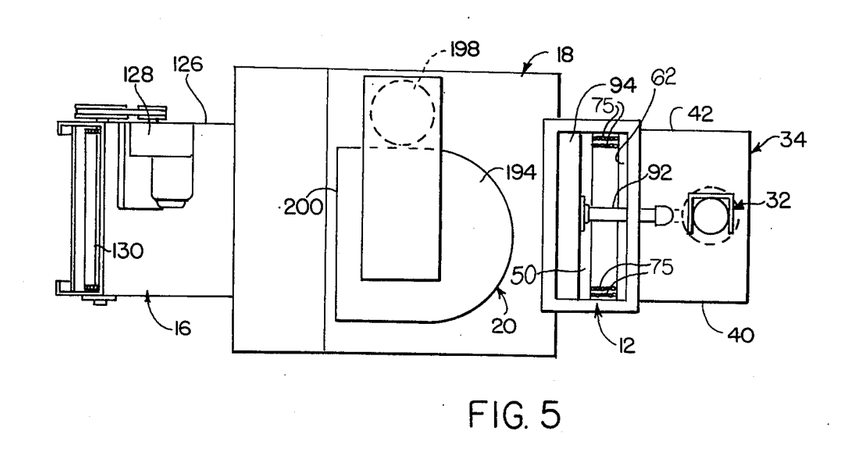
FIG. 5 is a top plan view of the air cleaning device illustrated in FIG. 3.

The front and rear walls 24 and 30 of the wash section are substantially parallel, as are the lateral side walls 26 and 28. A bottom wall portion 54 is integral with and connected to the bottom wall portion 44 of the wash liquid pump section 32. The front wall 24 extends downwardly to a conjunction with the top plate 36. The rear wall 30 (FIG. 4) extends downwardly to a line adjacent but substantially above the liquid level W in the settling tank section 14, forming an open free space or port 56 above the liquid surface for passage of the wash liquid laden air stream from the wash section 12 into the settling tank section 14 or upwardly into the moisture eliminator section 18 thereabove.

The front and rear walls 24 and 30 of the wash section 12 extend across the entire width of the wash section and are provided on their inner surfaces with a plurality of baffle supporting brackets 60 fixedly secured to these walls. Transversely-arcuate baffle members 62, 64 are removably secured at their upper edges by inturned flanges 66, 68 respectively affixed to and upon brackets 60 spaced apart in vertical alignment on opposite facing walls 24, 30, to form a venturi passage 70 therebetween. The baffle members extend the full width of the wash section from one lateral side wall to the other. The baffle members 62, 64 are pivotally supported on the brackets 60, permitting enlargement or reduction of the venturi passage 70 therebetween, to achieve an optimum functional relationship. A pair of link chains 75, 75 are fixedly secured to each baffle member adjacent its lower lateral edges for further adjustably positioning the members 62, 64 to form a smaller or larger venturi passage 70 therebetween. The free ends of the chains 75 are removably engaged upon hooks 76 affixed to the opposite front and rear walls 24, 30.

The baffle members 62, 64 are transversely arcuate, being substantially flat or slightly concavely-curved in their upper and convexly-curved in their lower depending portions, terminating at their lower edges in inturned flanges 72, 74 respectively.

Wash liquid is supplied to the wash section 12 by the pump section 32 having a pump assembly 80 comprising the pump 82, a motor 84 shaft-connected to the pump and supported upon the housing 86 and yoke 88 fixedly attached to the top plate 36. The pump 82, connected by a conduit 90 affixed to the top plate 36 and a conduit 92 extending through an opening in the wash section wall 24, serves wash liquid to the liquid discharge chamber 94 defined by the housing 96 secured to the rear wall 30 and terminating at its distal edge in the flange 98 spaced inwardly from the rear wall 30 and from the baffle plate member 48, 50 relatively adjacent therebelow. Wash liquid discharged from the chamber 94 issues from the opening 100 between the distal edge of the flange 98 and the inner surface of rear wall 30.

The wash section 12 is served with water, wash liquid or solution forcibly discharged at relatively low velocity through the opening 100 adjacent the rear wall 30 and upon the baffle plate member 48, 50 into the input contaminated air stream entering through the top wash section opening 102 at a substantially high velocity. The wash liquid is discharged under pressure from the pump 82, and as it sweeps into the wash section chamber against the input air stream, the difference in their respective velocities generates a considerable turbulence of wash liquid and contaminated air. The liquid particles are broken up into a fine spray trapping particulate matter in the air stream and surrounding such particles with a moisture shell or coating. The input air stream, relatively free of moisture before it enters the wash section, apart from ambient moisture, flows at a velocity of from about 2500 to 4,000/5,000 feet per minute in the region ahead of the venturi passage 70 formed by the spaced apart arcuate baffle members 62, 64. When the particulate matter in the air stream is struck by the wash liquid issuing from the opening 100 and the particles become enveloped with moisture shells, the turbulent flow impinges upon the surfaces of the baffle members 62 and 64 and causes a moisture flow in droplets or coursing liquid downwardly across the arcuate surfaces of these baffle members toward the liquid in the lower portions of the wash and pump sections.

As the moisture laden particulate matter enters and passes through the venturi passage 70, the substantial turbulence previously generated in the upper region of the wash section increases considerably to form many more droplets of moisture so as to contact and enshroud more contaminant particles with a moisture shell, which by virtue of their now increased mass and weight are carried downwardly toward and in a fair measure directly into the liquid of the wash section 12, the moisture eliminator section 18 and the pump section 32.

As described in more detail in the aforementioned Evans et al U.S. Pat. No. 3,811,252, the settling tank 14 comprises generally a lower liquid containing tank housing 118 having a bottom wall portion 120 integrally formed with and connected to the wash section bottom wall portion 54 and the pump section bottom wall portion 44, and lateral, front and rear walls extending upwardly and connected to the front, lateral side and rear walls of the moisture eliminator section 18. The sludge conveyor section 16, provided with an outer housing 126 adjacent and connected to the settling tank housing 118, is of generally conventional construction and comprises a housing 126, a motor drive 128 chain-connected to a conveyor drive shaft and sprocket for driving a pair of endless chains supporting a plurality of scraper flights 130 secured to the chains.

As more particularly described in the aforementioned Evans et al U.S. Pat. No. 3,811,252, the moisture eliminator section 18 is provided with a housing 138 comprising the lateral side walls 140, 142, the rear wall 144 and a front wall which is common with the inner or rear wall 30 of the wash section 12, as shown, or may be separate and discrete therefrom.

Figure 6:
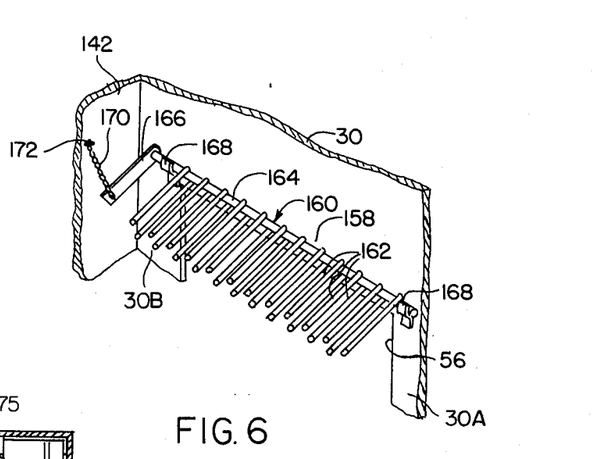
FIG. 6 is a fragmentary perspective view taken from inside the moisture eliminator section in the direction of the air comb.

Extending between the two lateral side walls 140 and 142 of the moisture eliminator housing 138 are two banks 146 and 148 of moisture eliminator vanes 150 spaced vertically apart from each other, the lower bank 146 being arranged at an angle and inclined downwardly from the common wall 30 toward the rear wall 144. The vanes 150, which extend across the moisture eliminator section from side wall 140 to its opposite wall 142, are arrowhead-shaped in transverse section and are disposed substantially equidistant from and in parallel to each other, with their apices pointed toward the wash section from which the moisture-laden air stream issues.

Where common with the wash section rear wall 30, the moisture eliminator housing front wall defines the opening 56 above the wash liquid level W (FIGS. 4 and 6) at its upper limit by the lower edge portion 158 and at its lateral limits by the vertical wall portions 30A and 30B which extend downwardly into the wash liquid substantially to the bottom wall portion 120. The moisture eliminator housing 138 is further provided with a top plate 152 having an opening 154 therethrough for communication with and discharge of clean air into the air suction fan section 20.

The moisture eliminator section 18 is further provided with an air comb 160 (FIG. 6) comprising a plurality of rods 162 fixedly secured at their proximal ends to a rod, bar or pipe member 164 so as to project therefrom at right angles from above and below the member 164 in staggered relationship as shown, or at any other suitable angle whereby air flow therethrough will be convoluted, the rows of rods 162 being spaced apart from each other a distance such that agglomeration of solid and particulate matter will not clog and close the spaces therebetween to shut off the air stream flow therethrough. A lever member 166 is affixed to one end of the rod 164, or alternatively it may be secured thereto inwardly of the end of the rod, for pivoting the air comb vertically upon bracket supports 168, 168 fixedly mounted upon the inner surface of the common wall 30 or adjacent lower portions 30A and 30B adjacent the opening 56. A chain-type lift member 170 is affixed to the distal end of the lever member 166 for pivoting the air comb into the desired or required angular posture, and a chain-engaging pin or hook 172 is affixed to the adjacent lateral side wall 142 for securing the chain. Of course, it will be understood that other suitable means for pivoting the air comb and securing it in the desired posture can be used.

The moisture eliminator vanes 150 are spaced rather closely together and in parallel orientation with their angulations arranged such that the line of sight transversely through and between the vanes is broken by the sides or legs of next adjacent vanes. Such spatial relationship causes the flow of moisture laden air and particulate matter therethrough to impinge first upon the surfaces of the lower legs of the vanes, then to make a sharp turn and reverse course between the vane surfaces to the medial portion thereof, with another reverse turn above the apex of the angulated vanes and against the surfaces of the upper legs of adjacent vanes before exiting from the lower bank 146 into an intermediate chamber 180, then through the upper bank of vanes 148 and into the upper chamber 182, before discharge through the opening 154 and into the air suction fan section 20.

The wash section housing and the moisture eliminator section housing are each preferably provided at their lateral side walls with glazed windows 186, 188, respectively, whereby visual inspection of wash section and moisture eliminator section operations can be easily made. Each window is suitably framed and preferably removably or hingedly mounted in its respective wall, to which it is sealed when closed against the loss of moisture and air therewithin.

The air suction fan 20 comprises generally a fan housing 194, a fan 196 and a motor drive 198 connected to the fan 196 for rotating the same. The output opening 200 of the housing 194 may be directed to the atmosphere of the area in which the apparatus 10 is located or may be connected to a conduit for passage of the clean output air to any other convenient or desired location.

Figure 7:
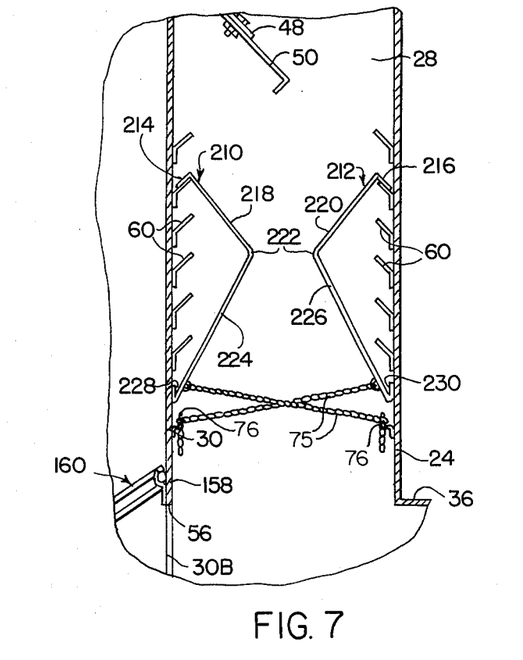
FIGS. 7, 8 and 9 are fragmentary vertical sectional views, showing modified forms of the baffle members forming the venturi passage therebetween.
Figure 8:
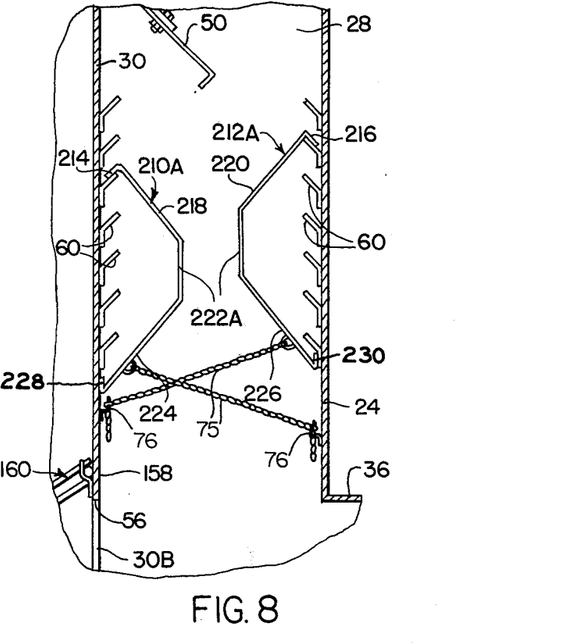
Figure 9:
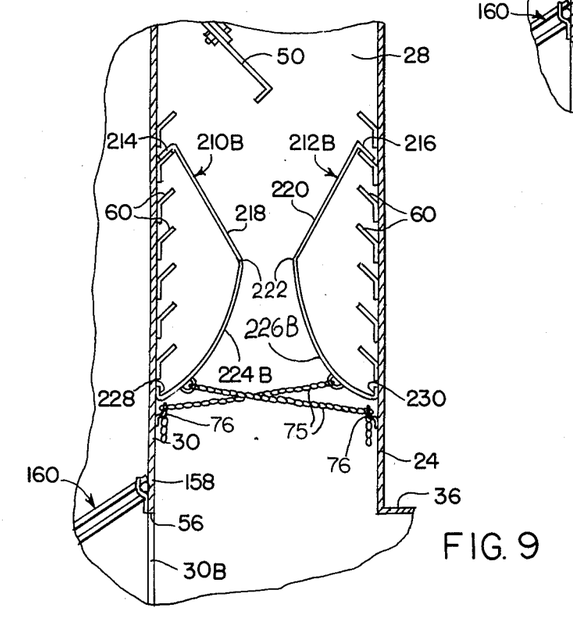
Figure 10:
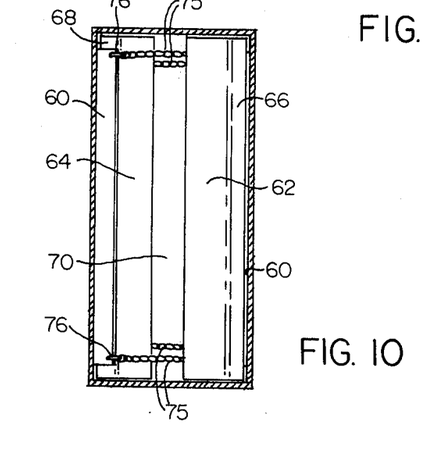
FIG. 10 is a horizontal sectional view taken substantially on the line 10—10 of FIG. 4.

As illustrated in FIGS. 7, 8 and 9, the pair of baffle members forming the venturi passage may be somewhat modified in transverse configuration from the arcuate form of the members 62, 64, in that the baffle members can have planar surfaces as well as arcuate surfaces. As shown particularly in FIG. 7, the baffle members 210 and 212 are arranged in opposing relationship and are provided along their upper longitudinal edges with inturned flanges 214 and 216 respectively for engagement with and upon the brackets 60, first upper converging planar surfaces 218 and 220 respectively, a constriction or throat 222, 222 arranged substantially in parallel and horizontal alignment, and lower diverging planar surfaces 224, 226 respectively terminating at their lower longitudinal edges in upturned or inturned flanges 228, 230 respectively. The baffle members 210 and 212 extend substantially the full width of the wash section, from side wall 26 to side wall 28, and are supported on the brackets 60 secured to the inner surfaces of the opposing facing walls 30 and 24 respectively in parallel opposing relationship, to form the venturi whereby substantially increased velocity and turbulence are generated in the region of the diverging planar surfaces 224 and 226.

As illustrated particularly in FIG. 8, the baffle members 210a and 212a are modified forms of the baffle members 210 and 212 respectively in that the longitudinally extending medial portions of the baffle members comprise substantially planar web sections 222a having a transverse extent such that when positioned upon the bracket members 60 the facing web sections have at least portions thereof facing each other to form the venturi throat therebetween. Of course, it will be understood by persons skilled in the art to which the invention pertains that the baffle members 210a and 212a can be arranged in parallel horizontally aligned opposing relationship whereby the full transverse extent of the web sections 222a of each baffle member is disposed in full opposing relationship.

A third modification is that illustrated in FIG. 9, wherein the baffle members 210b and 212b are provided in their lower regions with arcuate or curved diverging surfaces 224b and 226b respectively, terminating at their distal longitudinal edges in the upturned flanges 228 and 230 respectively.

Although the lower inturned edges 228, 230 of the baffle members illustrated in FIG. 7, 8 and 9 are shown as bearing upon the walls 24, 30 respectively from which they depend, link chains 75, 75 affixed to the baffle members can also be used to further adjust them into closer venturi-forming passages therebetween, as desired or required.

In operation the wash section 12 performs its function of contacting particulate matter of the input contaminated air stream with wash liquid in the following manner. The wash section 12 is usually connected at its input opening 102 to ductwork or conduits (not shown) that lead to machines or equipment generating a considerable amount of solid particles such as grinding dust and metals, polishing compound, and other industrial air contaminants. The distal ends of such ductwork are designed to accept these contaminants, as well as pieces of paper, fabrics and other materials, which can be drawn by the air stream, moving at negative pressure, into the ductwork leading to the wash section input opening 102. To effectively remove contaminant particles from the air stream, they must be absorbed by, or enshrouded or encased in moisture droplets. To such end, the wash liquid pumped into the chamber 94 by pump 82 is discharged through opening 100 across the entire width of the wash section from side wall 26 to side wall 28, flowing forcefully and at relatively low velocity in a sort of sheet directly into the air stream which is rushing downwardly from entry opening 102 toward the baffle plate 48, 50 and the baffle members 62, 64 disposed therebelow.

The input air stream is traveling through the input opening 102 generally at a rate of from about 2500 to 4000/5000 feet per minute while the wash liquid is being discharged through opening 100 to the wash section at a rate of from about 500/600 feet per minute, in a volume of up to about 50/60 gallons per 1000 cubic feet of air. The wash liquid pump 82 normally operates at a pressure head of approximately 10 feet. Air cleaning machines produced in accordance with the disclosure in the aforesaid Evans et al U.S. Pat. No. 3,811,252 have a rated air stream output velocity of from about 5000 to 40,000 cubic feet per minute at the discharge opening 200 of the suction fan section 20.

Although a substantial intermix of moisture and contaminated air stream occurs in the region ahead of the arcuate baffle members 62, 64, further turbulence is generated, to form substantially more and smaller distinct and discrete globules or droplets of wash liquid, as the mixture of wash liquid and air enters and passes through the venturi passage 70 between the baffle members. The formation of more minute spheroids or units of wash liquid within the space-limited chamber of the wash section results in more intimate contact of moisture globules with the solid particulate matter in the air stream. The increased turbulence generated by the venturi co-mingles the moisture spheroids or droplets with the solid particles to effect the desired enshrouding of those particles with a moisture shell. Their now-increased mass and weight more easily and effectively results in their entrapment in the tank liquid at the level W or upon the surfaces of the moisture eliminator vanes 150 as they pass thereto in the moisture eliminator section 18.

The air comb 160, designed to contact and engage the larger particulate matter carried by the moisture laden air stream, such as pieces of paper or fabric or other relatively large masses of solid material, is constructed to pass the moisture laden air stream therethrough. But the moisture eliminator vanes 150 are designed for impingement thereon of the finer particles that are enshrouded or encased in moisture for their removal by gravity into the liquid of the settling tank.

The air stream, now effectively cleaned of contaminants in the wash and moisture eliminator sections 12 and 18 respectively, passes into the air suction fan section 20 and is discharged by the fan 196 through the exit opening 200 either directly into the atmosphere of the area in which the apparatus 10 is located or into a conduit or ductwork (not shown) leading to an area or areas in which the now-cleaned air is required.

The preceding description of operation for the wash section 12 embodying the arcuate baffle members 62 and 64 also applies to the function of the wash section 12 in which the angulated or modified baffle members 210 and 212, 210a and 212a, and 210b and 212b are arranged in venturi-forming relationships.

Components of the wash section 12 including the wash liquid baffle plate members 48 and 50, the housing walls 24, 26, 28 and 30, the baffle members forming the venturi 62 and 64, 210 and 212, 210a and 212a, and 210b and 212b, and the housing 96 for wash liquid at the top of the wash section adjacent the entry opening 102, are each preferably fabricated of steel sheet metal or bar stock suitably coated or treated to resist corrosion in accordance with currently conventional practice. The brackets 60 are preferably fabricated of heavy gauge steel strip or bar stock, and of course the conduits 90 and 92 with their fittings are fabricated of steel pipe stock designed for heavy industrial service.

As illustrated in FIG. 8, the intermediate planar web portions 222a of baffle members 210a and 212a are shown disposed in parallel, vertically offset and opposing attitude with each other. They may also be placed in parallel, horizontally aligned and opposing relatonship. Although FIGS. 7 and 9 show the baffle members 210 and 212, 210b, and 212b to be parallel, horizontally aligned and opposing each other, they may in each instance be vertically offset to each other respectively. The resultant effects will of course be some varying or modified turbulence of the moisture laden air stream passing through the venturi throats, in each instance.

The venturi formed by any of the sets of baffle members disclosed hereinabove generates very high and, depending upon their spaced relationship at the venturi throat, exceptionally high air stream velocities resulting in very efficient air cleaning. Horsepower requirements for the air suction fan unit 20 may be as high as up to 200 horsepower, generating a pressure drop in the apparatus of up to as much as 40 or more column inches. Since high energy air scrubbers are generally defined as operating in a range of 20 column inches and higher, the apparatus and wash section hereindisclosed are considered to function at efficiencies assigned to high energy air cleaning devices.

Although a certain particular embodiment of the invention is hereindisclosed for purposes of explanation, further modifications thereof, after study of this specification may or will become apparent to those skilled in the art to which the invention pertains. Reference should be had to the appended claims in determining the scope of the invention.

I claim:

1. An improved wash section in air cleaning apparatus to remove solid particulate matter from a contaminated air stream introduced into the wash section, said apparatus having, as respective portions thereof and communicating with said wash section,
first means for introducing said contaminated air stream into said wash section at a relatively high input velocity and second means for discharging a wash liquid into said wash section at a relatively low input velocity in comparison with the input velocity of said air stream and into the path of said air stream for intimate intermixing therewith, the improvement comprising
a housing defining a wash section and having conjoined front, rear and lateral walls, an air stream input opening at the upper end of said housing and a discharge opening adjacent the lower end of said housing through one of said walls, said second means including wash liquid discharge means adjacent and below said air stream input opening, comprising
a wash liquid discharge chamber housing secured to one of said wash section housing walls and having a wash liquid discharge opening at its lower end so that said wash liquid is discharged downwardly therefrom and substantially in a gravitational direction, and a wash liquid baffle plate secured to said one wall adjacent and below said wash liquid discharge opening and extending partially across the cross-sectional area of said wash section housing to deflect wash liquid discharged thereonto into the path of said air stream,
said wash liquid discharge chamber housing, said wash liquid discharge opening and said wash liquid baffle plate extending substantially the entire width of said one wall,
said wash liquid discharge means providing a broad forceful stream of wash liquid in a wide torrent at a relatively low discharge output velocity adjacent and below said air stream input opening to create considerable turbulence with said air stream entering said wash section housing at a relatively high input velocity in the vicinity of and below said baffle plate,
and a pair of baffle members disposed and secured in venturi forming relationship on opposite facing walls of said wash section housing, somewhat below said wash liquid baffle plate and above said wash section housing discharge opening,
a turbulence chamber defined by said wash liquid baffle plate, said wash section housing walls and said venturi forming baffle members for intimate intermixing of said wash liquid and air stream to form a moisture-laden air stream,
means on said opposite facing walls for adjustably and removably securing said baffle members to said wash section housing walls in substantially opposing relationship to form a venturi passage between said baffle members of selectively adjustable and variable capacity,
whereby the turbulence of the moisture-laden air stream is substantially increased and more intimate intermixing of said wash liquid and said solid particulate matter is effected adjacent and in said venturi passage to form a volume of moisture covered solid particles in proportion to the measure of turbulence generated in said turbulence chamber and said venturi passage.

2. The wash section defined in claim 1, wherein
said baffle member securing means comprises
a plurality of baffle member-supporting bracket members secured to and arranged in spaced apart vertical alignment on each of said opposite facing walls of said wash section housing, said baffle members being secured to and depending from selected bracket members on each said wall in a venturi passage-forming relationship.

3. The wash section defined in claim 1, wherein said baffle members are arcuately formed transversely thereof.

4. The wash section defined in claim 3, wherein said arcuate baffle members are slightly concave in their upper portions and convexly curved in their medial and lower portions.

5. The wash section defined in claim 3, wherein said arcuate baffle members are convexly curved in their medial and lower portions.

6. The wash section defined in claim 1, wherein said baffle members are arranged in horizontally parallel opposing relationship with each other.

7. The wash section defined in claim 1, wherein said baffle members are spaced vertically offset with respect to each other to produce a venturi passage therebetween having a horizontal component, whereby said moisture-laden air stream follows a tortuous direction-changing course through said wash section.

8. The wash section defined in claim 1, wherein said baffle members are vertically adjustable on said opposite facing housing walls to increase or decrease said venturi passage therebetween.

9. The wash section defined in claim 1, wherein said pair of baffle members is arranged in substantially parallel and opposing attitude on said facing walls,
said baffle members having upper planar longitudinally extending surfaces converging downwardly toward each other to form a venturi throat therebetween and lower planar longitudinally extending surfaces diverging from each other and said throat toward the respective walls upon which said baffle members are secured.

10. The wash section defined in claim 1, wherein each said baffle member is formed as an integral unit comprising
a longitudinally extending upper planar portion and a longitudinally extending lower planar portion joined thereto to form a venturi throat along the longitudinal line of intersection of said upper and lower planar portions,
said upper and lower planar portions being angulated with respect to each other transversely of said baffle member about said line of intersection, said baffle members being arranged on opposite facing walls of said wash section housing so that said longitudinal lines of intersection are in substantially opposing attitude and said upper planar portions of said baffle members diverge upwardly away from each other and said lower planar portions of said baffle members diverge downwardly away from each other.

11. The wash section defined in claim 1, wherein each said baffle member is formed as an integral unit comprising
 a longitudinally extending upper planar portion, a longitudinally extending lower planar portion and a longitudinally extending intermediate planar portion, said upper and lower planar portions being angulated with respect to each other transversely of said baffle member about, on the same side of and from the upper and lower longitudinal edges respectively of said intermediate planar portion,
 said baffle members being arranged on opposite facing walls of said wash section housing so that said intermediate planar portions are in substantially opposing attitude and said upper planar portions of said baffle members diverge upwardly away from each other and said lower planar portions of said baffle members diverge downwardly away from each other,
 said baffle members at said intermediate planar portions defining a venturi throat therebetween.

12. The wash section defined in claim 11, wherein said baffle members are arranged in substantially parallel, horizontally aligned and opposing attitude on said facing walls.

13. The wash section defined in claim 11, wherein said baffle members are arranged in substantially parallel, vertically offset and opposing attitude on said facing walls.

14. The wash section defined in claim 1, wherein each said baffle member is formed as an integral unit comprising
 a longitudinally extending upper planar portion and a longitudinally extending lower transversely arcuate portion joined thereto to form a venturi throat along the longitudinal line of intersection of said upper planar portion and said lower arcuate portion,
 said upper and lower portions being angulated with respect to each other transversely of said baffle member about said line of intersection,
 said baffle members being arranged on said opposite facing walls of said wash section housing so that said longitudinally extending lines of intersection are in substantially opposing attitude and said upper planar portions of said baffle members diverge upwardly away from each other and said lower arcuate portions of said baffle members diverge downwardly away from each other.

15. The wash section defined in claim 14, wherein said baffle members are horizontally aligned with each other.

16. The wash section defined in claim 14, wherein said baffle members are vertically offset with respect to each other.

17. The wash section defined in claim 1, and including
 means attached to said baffle members and to said walls for adjustably positioning said baffle members relative to each other to form said venturi passage.

18. The wash section defined in claim 17, wherein said adjusting means comprises
 a pair of link chains affixed to each said baffle members,
 and a plurality of chain engaging members affixed to said opposite facing walls,
whereby each said baffle member can be adjustably pivoted upon said baffle member supporting means toward or away from the other to form a smaller or larger venturi passage therebetween.

* * * * *